US009892618B2

(12) United States Patent
Mandava et al.

(10) Patent No.: US 9,892,618 B2
(45) Date of Patent: Feb. 13, 2018

(54) SIGNAL EMITTING MEMBER ATTACHMENT SYSTEM AND ARRANGEMENT

(71) Applicant: Mobile Aspects, Inc., Pittsburgh, PA (US)

(72) Inventors: Suneil Mandava, Pittsburgh, PA (US); Khang Nguyen Le, Murrieta, CA (US); Pribadi Kardono, Monroeville, PA (US); Timur P. Sriharto, Monroeville, PA (US)

(73) Assignee: Mobile Aspects, Inc., Pittsburgh, PA (US)

( * ) Notice: Subject to any disclaimer, the term of this patent is extended or adjusted under 35 U.S.C. 154(b) by 74 days.

(21) Appl. No.: 14/455,131

(22) Filed: Aug. 8, 2014

(65) Prior Publication Data

US 2015/0042455 A1 Feb. 12, 2015

Related U.S. Application Data

(60) Provisional application No. 61/864,136, filed on Aug. 9, 2013.

(51) Int. Cl.

| | |
|---|---|
| ***G08B 21/24*** | (2006.01) |
| ***A41F 15/00*** | (2006.01) |
| ***A44C 25/00*** | (2006.01) |
| ***A44C 11/02*** | (2006.01) |
| ***G08B 23/00*** | (2006.01) |
| ***G08B 1/08*** | (2006.01) |
| ***B65G 17/20*** | (2006.01) |

(52) U.S. Cl.
CPC .................................... *G08B 21/24* (2013.01)

(58) Field of Classification Search
CPC ........ G08B 21/24; A44G 13/00; A44C 25/00; A44C 11/02; A41F 15/005; A41F 15/00
USPC ............... 340/5.61, 573.1, 572.8, 10.1–10.5; 63/40, 3.1, 1.11
See application file for complete search history.

(56) References Cited

U.S. PATENT DOCUMENTS 2,845,672 A * 8/1958 Molene ................ A44C 5/2057
24/116 A
3,575,282 A * 4/1971 Gaiotto .................. B65G 39/20
104/172.5
3,958,102 A 5/1976 Burt
4,116,512 A 9/1978 Wiser
4,118,693 A 10/1978 Novikoff
4,227,037 A 10/1980 Layton
(Continued)

FOREIGN PATENT DOCUMENTS

JP 2001052054 A 2/2001
JP 2002282200 A 10/2002

OTHER PUBLICATIONS

U.S. Appl. No. 14/013,625, filed Aug. 29, 2013.
(Continued)

*Primary Examiner* — Nam V Nguyen
(74) *Attorney, Agent, or Firm* — The Webb Law Firm

(57) ABSTRACT

A signal emitting member attachment system for attaching at least one signal emitting member to an item to be tracked, which includes an adjustable band configured to be placed on the item; and at least one fob. The adjustable band and the at least one fob are configured so that the at least one fob is connectable to the band. The at least one signal emitting member is disposed on the at least one fob.

23 Claims, 3 Drawing Sheets

(56) References Cited

U.S. PATENT DOCUMENTS 4,292,345 A * 9/1981 Kolesnik ............... C04B 41/009 252/506
4,377,078 A * 3/1983 Block .................. A44C 5/2057 24/116 A
4,496,406 A 1/1985 Dedow
4,636,634 A 1/1987 Harper et al.
4,636,950 A 1/1987 Caswell et al.
4,673,932 A 6/1987 Ekchian et al.
4,838,410 A * 6/1989 Gough .................. B65G 17/22 198/417
4,847,764 A 7/1989 Halvorson
4,860,918 A 8/1989 Wuyten et al.
5,029,183 A 7/1991 Tymes
5,194,856 A 3/1993 Zijistra
5,287,414 A 2/1994 Foster
5,295,154 A 3/1994 Meier et al.
5,389,919 A 2/1995 Warren et al.
5,408,443 A 4/1995 Weinberger
5,410,315 A 4/1995 Huber
5,411,445 A * 5/1995 Oda ........................ B21L 11/12 474/154
5,413,236 A 5/1995 Kenevan
5,431,299 A 7/1995 Brewer et al.
5,461,805 A * 10/1995 Johnson ............... A01K 11/001 119/814
5,495,961 A 3/1996 Maestre
5,520,417 A * 5/1996 Kennemer ........... A01K 11/001 283/74
5,565,858 A 10/1996 Guthrie
5,592,835 A * 1/1997 Herr .................... A44C 11/007 63/21
5,689,238 A 11/1997 Cannon, Jr. et al.
5,713,485 A 2/1998 Liff et al.
5,729,697 A 3/1998 Schkolnick et al.
5,739,765 A 4/1998 Stanfield et al.
5,751,220 A 5/1998 Ghaffari
5,751,221 A 5/1998 Stanfield et al.
5,765,707 A 6/1998 Kenevan
5,771,003 A 6/1998 Seymour
5,774,053 A 6/1998 Porter
5,774,059 A 6/1998 Henry et al.
5,797,515 A 8/1998 Liff et al.
5,801,628 A 9/1998 Maloney
5,804,810 A 9/1998 Woolley et al.
5,857,152 A 1/1999 Everett
5,912,818 A 6/1999 McGrady et al.
5,917,433 A 6/1999 Keillor et al.
5,936,527 A 8/1999 Isaacman et al.
5,950,630 A 9/1999 Portwood et al.
5,993,046 A 11/1999 McGrady et al.
6,075,441 A 6/2000 Maloney
6,112,502 A 9/2000 Frederick et al.
6,116,461 A 9/2000 Broadfield et al.
6,127,928 A 10/2000 Issacman et al.
6,204,764 B1 3/2001 Maloney
6,213,839 B1 * 4/2001 Pedersen .................. A63H 3/36 446/101
6,223,559 B1 * 5/2001 Coleman ............ A44C 15/0015 40/455
6,255,951 B1 * 7/2001 De La Huerga ........ A61J 1/035 340/5.8
6,296,148 B1 10/2001 Myers et al.
6,323,782 B1 11/2001 Stephens et al.
6,392,544 B1 5/2002 Collins
6,401,488 B1 * 6/2002 Cousin ................. A44C 11/002 434/171
6,407,665 B2 6/2002 Maloney
6,424,262 B2 7/2002 Garber et al.
6,445,297 B1 9/2002 Nicholson
6,512,459 B2 1/2003 Benezech et al.
6,512,478 B1 1/2003 Chien
6,662,597 B2 * 12/2003 Vanasse ................... A44C 5/20 24/574.1
6,677,857 B2 1/2004 Bara et al.
6,703,935 B1 3/2004 Chung et al.
6,707,381 B1 3/2004 Maloney
6,714,121 B1 3/2004 Moore
6,718,888 B2 4/2004 Muirhead
6,745,027 B2 6/2004 Twitchell, Jr.
6,747,558 B1 6/2004 Thome et al.
6,750,771 B1 6/2004 Brand
6,762,676 B2 7/2004 Teowee et al.
6,788,199 B2 * 9/2004 Crabtree ................... G01S 3/54 340/539.13
6,796,274 B1 * 9/2004 Moynihan, III ....... A01K 25/00 119/831
6,826,514 B1 11/2004 Antico et al.
6,870,464 B2 3/2005 Okamura
6,888,241 B1 * 5/2005 Korn ..................... G09F 3/0323 257/728
6,943,678 B2 9/2005 Muirhead
6,966,698 B2 * 11/2005 Wu ..................... F16C 29/0635 384/49
6,989,749 B2 1/2006 Mohr
7,009,518 B2 3/2006 Liao et al.
7,009,576 B2 3/2006 Adamson et al.
7,126,926 B1 10/2006 Bjorklund et al.
7,130,773 B1 10/2006 Wong
7,135,973 B2 11/2006 Kittel et al.
7,152,791 B2 12/2006 Chappidi et al.
7,178,982 B2 * 2/2007 Chin-Pei ............. F16C 33/3825 384/45
7,187,287 B2 3/2007 Ryal
7,233,620 B2 6/2007 Brommer
7,239,238 B2 * 7/2007 Tester .............. G06K 19/07798 292/307 R
7,256,682 B2 8/2007 Sweeney, II
7,257,967 B2 * 8/2007 Rheinstein ............. A44C 11/00 63/1.11
7,265,675 B1 9/2007 Carrender et al.
7,286,043 B2 10/2007 Carrender et al.
7,298,243 B2 11/2007 Juels et al.
7,310,045 B2 12/2007 Inui
7,318,261 B2 1/2008 Bills
7,322,214 B2 * 1/2008 Ignatowski .......... A44C 15/001 351/52
7,342,496 B2 3/2008 Muirhead
7,348,884 B2 3/2008 Higham
7,401,375 B2 7/2008 McLeod
7,406,840 B2 * 8/2008 Brancato ............... A41F 15/002 63/3
7,420,458 B1 9/2008 Kuzma et al.
7,433,648 B2 10/2008 Bridgelail
7,636,047 B1 * 12/2009 Sempek ................. G08B 21/22 340/572.1
7,758,523 B2 7/2010 Collings et al.
8,115,621 B2 * 2/2012 Rajala ..................... G01S 1/042 340/539.11
8,120,497 B2 2/2012 Binmore
8,484,049 B2 7/2013 Mullenger et al.
8,540,544 B1 * 9/2013 Logue ...................... A44C 5/00 446/101
8,831,627 B2 * 9/2014 Aninye ............... B60R 25/1004 340/539.11
9,027,740 B2 * 5/2015 Boehrer ................. B65G 17/20 198/678.1
2001/0002448 A1 5/2001 Wilson et al.
2001/0028308 A1 10/2001 De La Huerga
2001/0034613 A1 10/2001 Rubsamen
2001/0044731 A1 11/2001 Coffman et al.
2001/0052054 A1 12/2001 Franke et al.
2002/0027507 A1 3/2002 Yarin et al.
2002/0038167 A1 3/2002 Chirnomas
2002/0063622 A1 5/2002 Armstrong et al.
2002/0113082 A1 8/2002 Leatherman et al.
2002/0143320 A1 10/2002 Levin
2002/0145520 A1 10/2002 Maloney
2002/0153411 A1 10/2002 Wan et al.
2002/0183882 A1 12/2002 Dearing et al.
2002/0190871 A1 12/2002 Stanfield et al.
2003/0030539 A1 2/2003 McGarry et al.
2003/0034390 A1 2/2003 Linton et al.

(56) References Cited

U.S. PATENT DOCUMENTS

| | | | |
|---|---|---|---|
| 2003/0117281 | A1 | 6/2003 | Sriharto |
| 2003/0160698 | A1 | 8/2003 | Andreasson et al. |
| 2003/0164401 | A1 | 9/2003 | Andreasson et al. |
| 2003/0174099 | A1 | 9/2003 | Bauer et al. |
| 2004/0046020 | A1 | 3/2004 | Andreasson et al. |
| 2004/0069850 | A1 | 4/2004 | De Wilde |
| 2004/0069852 | A1 | 4/2004 | Seppinen et al. |
| 2004/0111335 | A1 | 6/2004 | Black et al. |
| 2004/0155003 | A1 | 8/2004 | Anderson et al. |
| 2004/0168618 | A1 | 9/2004 | Muirhead |
| 2004/0267545 | A1 | 12/2004 | Buchmann et al. |
| 2005/0024211 | A1 | 2/2005 | Maloney |
| 2005/0088284 | A1 | 4/2005 | Zai et al. |
| 2005/0088305 | A1 | 4/2005 | Greene et al. |
| 2005/0093679 | A1 | 5/2005 | Zai et al. |
| 2005/0099283 | A1 | 5/2005 | Johnson et al. |
| 2005/0237184 | A1 | 10/2005 | Muirhead |
| 2005/0241548 | A1 | 11/2005 | Muirhead |
| 2005/0280539 | A1 | 12/2005 | Pettus |
| 2006/0022800 | A1 | 2/2006 | Krishna et al. |
| 2006/0028081 | A1 | 2/2006 | Minagawa |
| 2006/0056370 | A1 | 3/2006 | Hancock et al. |
| 2006/0058018 | A1 | 3/2006 | Toulis et al. |
| 2006/0092040 | A1 | 5/2006 | Fishkin et al. |
| 2006/0109084 | A1 | 5/2006 | Yarvis |
| 2006/0143439 | A1 | 6/2006 | Arumugam et al. |
| 2006/0187043 | A1 | 8/2006 | Allen |
| 2006/0215593 | A1 | 9/2006 | Wang et al. |
| 2007/0046467 | A1 | 3/2007 | Chakraborty et al. |
| 2007/0096876 | A1 | 5/2007 | Bridgelall et al. |
| 2007/0103303 | A1 | 5/2007 | Shoarinejad |
| 2007/0164109 | A1 | 7/2007 | Ridings et al. |
| 2007/0171992 | A1 | 7/2007 | Shameli et al. |
| 2007/0172007 | A1 | 7/2007 | Shoarinejad et al. |
| 2007/0188342 | A1 | 8/2007 | Valeriano et al. |
| 2007/0200724 | A1 | 8/2007 | Lazo et al. |
| 2007/0216534 | A1 | 9/2007 | Ferguson et al. |
| 2007/0279202 | A1 | 12/2007 | Lionetti |
| 2008/0061940 | A1 | 3/2008 | Onderko et al. |
| 2008/0117050 | A1 | 5/2008 | Wu et al. |
| 2008/0198016 | A1 | 8/2008 | Lawrence et al. |
| 2008/0218354 | A1 | 9/2008 | Lorentz et al. |
| 2009/0009332 | A1 | 1/2009 | Nunez et al. |
| 2009/0261956 | A1 | 10/2009 | Ojeda et al. |

OTHER PUBLICATIONS

U.S. Appl. No. 14/487,809, filed Sep. 16, 2014.
U.S. Appl. No. 14/524,542, filed Oct. 27, 2014.
U.S. Appl. No. 14/558,064, filed Dec. 2, 2014.
U.S. Appl. No. 13/793,201, filed Mar. 11, 2013.
U.S. Appl. No. 13/662,897, filed Oct. 29, 2012.

* cited by examiner

SIGNAL EMITTING MEMBER ATTACHMENT SYSTEM AND ARRANGEMENT

CROSS REFERENCE TO RELATED APPLICATION

The present application claims priority from U.S. Provisional Patent Application No. 61/864,136 filed on Aug. 9, 2013, which is incorporated herein by reference in its entirety.

BACKGROUND OF THE INVENTION

Field of the Invention

The present invention relates generally to inventory management methods and systems, and signal emitting members, such as radio frequency identification tags, systems, and the like, for application in a variety of industries, such as the health care industry. In particular, the present invention relates to a device and method for attaching at least one radio frequency identification tag (or other signal emitting member) to an item to be tracked, such as for attaching such tags to a medical device.

Description of Related Art

Presently, in the health care industry, complex and expensive equipment and systems are utilized in the diagnosis and care process. As the development of this equipment and associated systems continues, the necessity to monitor and track the usage is of the utmost importance. Certain drawbacks and deficiencies exist in the prior art, including (1) theft of the equipment or its components; (2) inaccurate manual compliance and tracking methods; (3) ineffective and inefficient compliance monitoring and similar management; (4) inefficient equipment sharing and distribution; (5) high repair costs; (6) difficulty in tracking; (7) inaccurate identification and tracking methods, etc.

Many medical devices, such as endoscopes, are highly complex and expensive medical instruments to purchase, maintain, and repair. Unfortunately, equipment theft does occur, with some hospitals reporting the annual loss of 5-7 endoscopes, which, as stated, are extremely expensive to replace. According to the prior art, and especially in those procedures involving the use of many medical devices and equipment, such as endoscopes, compliance with hospital protocol is an entirely manual process, i.e., using “pen and paper”.

A solution to accurately and efficiently track the location of usage of equipment in the health care industry and in a wide variety of other industries is to attach at least one Radio Frequency Identification (RFID) tag to the equipment. Such tags include a microchip and a signal emitting member, such as a transmitter, programmed to emit a unique radio signal that can be read by a local control device in communication with a signal receiving device (e.g., an antenna) that is configured to receive and process the signal emitted by the signal emitting member. When an RFID tag having a unique identification frequency is scanned by a local control device in a particular location, the local control device communicates with a database to log the location of the item being tracked. Such systems are well known to those having ordinary skill in the art.

The problem with RFID-based tracking systems is that the ability to track items using RFID technology depends on the ability to attach an RFID tag to the item. Since items that can be tracked using RFID technology come in many different shapes, sizes, materials, and configurations, RFID tags have to be specifically designed for the item to be tracked. Such RFID tag designs may, by necessity, require permanent/semi-permanent attachment to the item to be tracked or alteration of the item to be tracked, may interfere with operation and use of the item to be tracked, and, if the item to be tracked is large, bulky, or irregular, may require that the item to be tracked be lifted, handled, and manually searched to scan the RFID tag. Additionally, as it relates specifically to the health care industry, the RFID tag may trap dirt, moisture, and other contaminants between itself and the item to be tracked, necessitating additional cleaning of the tag and the device, and removal of the tag to accomplish such cleaning

SUMMARY OF THE INVENTION

There is a general need in the art for an adjustable and configurable device for attaching at least one standardized signal emitting member to a variety of items to be tracked in any one of a number of different industries. There is also a general need in the art for an adjustable and configurable device for attaching at least one standardized signal emitting member to a medical device that prevents the trapping of contaminants between the signal emitting member and the device being tracked. Generally, provided is a configurable item tracking device and method that address or overcome some or all of the deficiencies and drawbacks noted above that occur in connection with existing tracking systems and devices.

According to one preferred and non-limiting embodiment, the present invention relates to a signal emitting member attachment system and arrangement that includes an adjustable band and a detachable fob that allows for an adjustable and configurable attachment of at least one signal emitting member, e.g., an RFID tag, to a medical device, such as an endoscope.

According to another preferred and non-limiting embodiment, the present invention relates to a signal emitting member attachment system for attaching at least one signal emitting member to an item to be tracked that includes an adjustable band configured to be wrapped around or placed in contact with the item; and at least one fob connectable to the band. The at least one signal emitting member is embedded within, attached to, or associated with the at least one fob.

In accordance with one preferred and non-limiting embodiment of the present invention, a signal emitting member attachment system for attaching at least one signal emitting member (e.g., an RFID tag) to an item to be tracked is provided. The system includes an adjustable band configured to be placed on or attached to the item and at least one fob. The adjustable band and the at least one fob are configured so that the at least one fob is attachable to the band. The at least one signal emitting member is disposed on or at least partially within the at least one fob.

The adjustable band may be configured to be placed on or attached to the item by being wrapped around the item. The at least one signal emitting member may be embedded at least partially within the at least one fob. The adjustable band and the at least one fob may be made wholly or partially from a silicon rubber material. The adjustable band may be configured to have a plurality of fobs attached thereto, and the at least one fob may include two, three, or more fobs. The at least one fob may be removably attachable to the band. The adjustable band may be configured to space the at least two fobs around a perimeter of the item to be tracked. The at least two fobs may include at least one fob having a signal emitting member or RFID tag that transmits high frequency signals, and at least one fob having a signal emitting member or RFID tag that transmits ultra high frequency signals, and the at least two or more fobs may be color coded or otherwise differentiated from each other.

In another preferred and non-limiting embodiment, the adjustable band includes a plurality of joints interconnected by flexible band segments and at least one nub extending from at least one of the plurality of joints, the at least one nub being configured to connect the at least one fob to the adjustable band. Each one of the plurality of joints may have a respective one of the plurality of nubs extending therefrom, or a portion of the plurality of joints may have a respective one of the plurality of nubs extending therefrom.

The at least one nub extends from the at least one of the plurality of joints in a direction substantially perpendicular to the band segments adjacent to the at least one of the plurality of joints. In one preferred and non-limiting embodiment, the at least one nub includes a stem extending from the at least one joint, and a shaped head disposed on the stem at an end opposite the at least one joint. The shaped head may be a conical tapered head tapering outwardly in a direction toward the at least one joint to define an annular abutment surface.

In this embodiment, the at least one fob includes a body having a first side and a second side, and a shaped hole extending through the body from the second side to the first side configured to at least partially receive at least a portion of the shaped head. The shaped hole may be a conical tapered hole tapering inwardly from the second side to the first side and configured to receive the conical tapered head of the nub so that, when the conical tapered head of the nub extends completely through the hole, the annular abutment surface engages the first side of the at least one fob to connect the at least one fob to the adjustable band. The adjustable band includes a loop disposed at one end of the adjustable band, the loop defining an aperture that is configured to receive and retain at least one joint disposed at an opposite end of the adjustable band to secure the adjustable band to the item to be tracked. The adjustable band may include a plurality of joints, at least one of the plurality of joints includes a spherical ball configured to define a single point of or minimal contact between itself and the item to be tracked. The adjustable band and the at least one fob may be color coded. The item to be tracked may be a person, an object, a medical item, medical equipment, e.g., an endoscope, and the like.

In accordance with another preferred and non-limiting embodiment of the present invention, a method of attaching at least one signal emitting member to an item to be tracked is provided. The method includes providing an adjustable band; providing at least one fob, the at least one fob having the at least one signal emitting member disposed thereon or at least partially therein; wrapping the adjustable band around the item; cutting an excess length of the band to position the adjustable band about the item and form a second end of the adjustable band opposite to a first end; connecting the first end of the band to the second end of the band; and connecting the at least one fob to at least a portion of the adjustable band.

The adjustable band may include a plurality of joints interconnected by flexible band segments, the method further including inserting at least one of the plurality of joints through an aperture in a loop at the first end of the adjustable band. The adjustable band may be configured to have a plurality of fobs attached thereto and the at least one fob may include at least two fobs. The adjustable band may be configured to space the at least two fobs around a perimeter of the item to be tracked. Each one of the plurality of joints may include a spherical ball configured to define a single point of or minimal contact between itself and the item to be tracked.

These and other features and characteristics of the present invention, as well as the methods of operation and functions of the related elements of structures, and the combination of parts and economies of manufacture will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
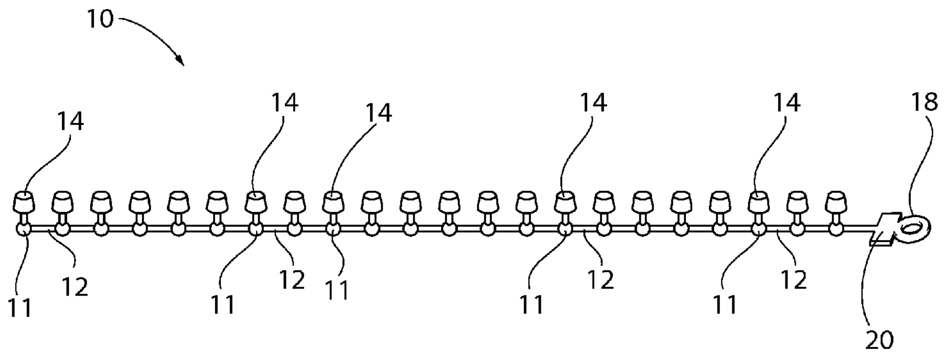
FIG. 1 is a perspective view of an adjustable band of a signal emitting member attachment system according to the principles of the present invention.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2:
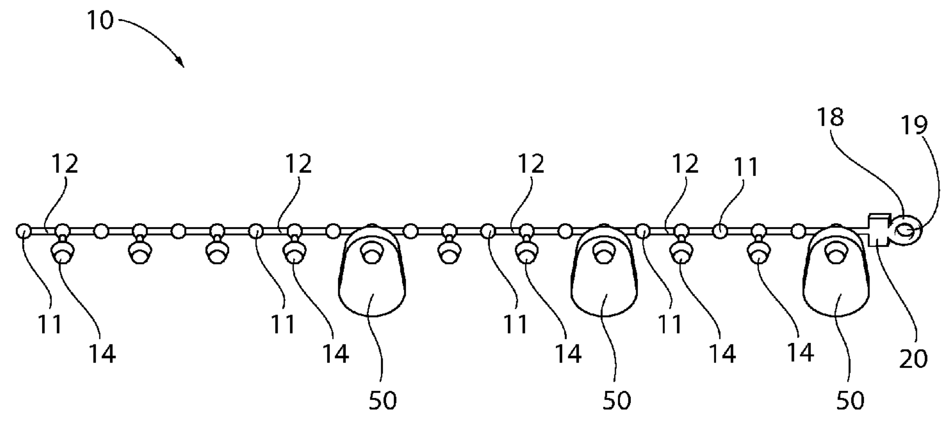
FIG. 2 is a perspective view of the adjustable band of FIG. 1 with a plurality of fobs attached thereto.

With reference to FIGS. 1 and 2, a preferred and non-limiting embodiment of a signal emitting member attachment system and arrangement in accordance with the principles of the present invention is shown. The signal emitting member attachment system includes an adjustable band 10 made from a flexible elastic material (e.g., a silicon rubber material), such that the band 10 may be stretched, bent, and/or cut to be attached to or placed on a variety of different items to be tracked, where these items may be people, objects, medical devices, medical equipment, and/or any other item that the user desires to track.

In this preferred and non-limiting embodiment, the adjustable band 10 includes a string of joints 11 interconnected by band segments 12. One end of the adjustable band 10 includes an end loop 18 defining an aperture 19. A tab 20 is also provided on the adjustable band 10 next to the loop 18 to facilitate handling of the adjustable band 10 at the loop 18. A plurality of nubs 14 extend from the joints 11 along the length of the adjustable band 10. As shown in FIGS. 1 and 2, the nubs 14 extend from the joints 11 perpendicularly or substantially perpendicularly to the band segments 12 adjacent to the respective joint 11. As shown in FIG. 1, the adjustable band 10 may be configured so that the nub 14 extends from each joint 11. As shown in FIG. 2, the adjustable band 10 may also be configured so that nubs 14 extend from only a portion, preferably a plurality, of the joints 11 of the adjustable band 10.

Figure 3:
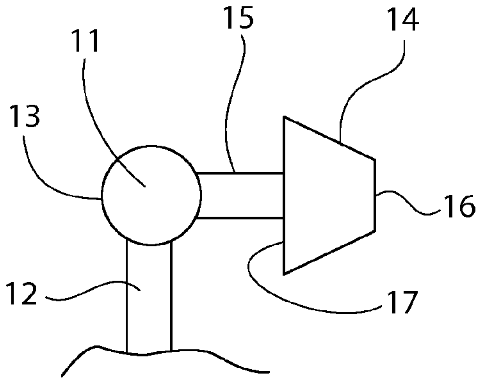
FIG. 3 is a side view of a portion of the adjustable band of FIG. 1.

With reference to FIGS. 2-7, the nubs 14 serve as attachment points for removably attaching at least one fob 50 to the adjustable band 10. As shown in FIG. 3, each nub 14 includes a stem 15 extending from the respective joint 11 and a shaped head 16, in particular a conical tapered head, disposed on an end of the stem 15 opposite from the respective joint 11. The conical tapered head 16 tapers outwardly in a direction toward the respective joint 11 to define an annular abutment surface 17.

Figure 4:
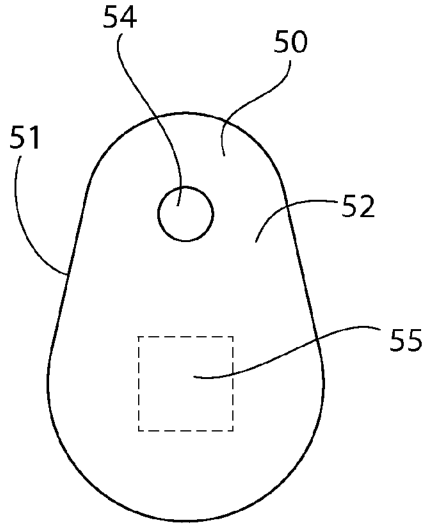
FIG. 4 is a front view of a fob of the signal emitting member attachment system according to the principles of the present invention.
Figure 5:
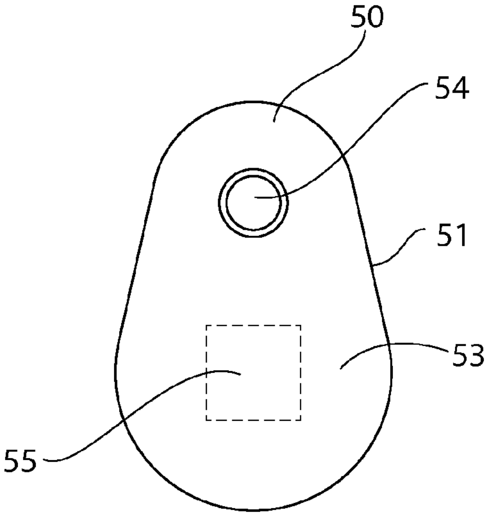
FIG. 5 is a rear view of the fob of FIG. 4.
Figure 6:
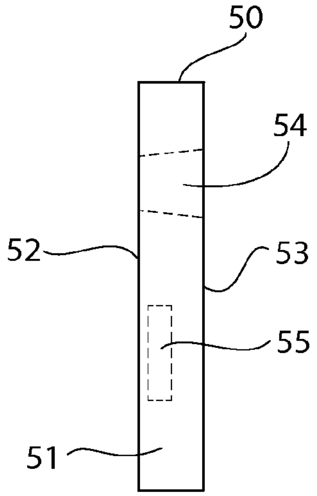
FIG. 6 is a side view of the fob of FIG. 4.

As shown in FIGS. 4-6, and in this preferred and non-limiting embodiment, the fob 50 includes a body 51 at least partially made from the same or similar material as the adjustable band 10 (e.g., a silicon rubber material). The body 51 includes a front side 52 and a rear side 53, with a shaped hole 54, in particular a conical tapered hole, extending through the body 51 from the front side 52 to the rear side 53. The conical tapered hole 54 tapers inwardly from the rear side 53 to the front side 52 of the body 51 and is sized and shaped to at least partially receive at least a portion of the conical tapered head 16 of one of the nubs 14 on the adjustable band 10, such as through a compression and/or friction fit between the head 16 and the hole 54. In this manner, the head 16 of the nub 14 can be pressed through the hole 54 of the fob 50, and be retained together. In order to remove the fob 50 from the band 10, the user may simply press on the head 16 or otherwise urge the head 16 of the nub 14 back through the hole 54. Based upon the nature and flexibility of the material, the fob 50 is retained on the band 10 once connected, and is removable therefrom upon the application of direct or intentional force applied to the head 16 of the nub 14. Accordingly, in this embodiment, the fob 50 may be attached to the adjustable band 10 by passing the conical tapered head 16 and stem 15 of the nub 14 through the conical tapered hole 54 in the body 51 of the fob 50 from the rear side 53 to the front side 52, such that the conical tapered head 16 of the nub 14 extends entirely through the hole 54 and the abutment surface 17 of the conical tapered head 16 comes into engagement with the front side 52 of the body 51 in order to retain the fob 50 on the nub 14 and the adjustable band 10. Also, as shown in FIGS. 4-6, the fob 50 includes a readable signal emitting member, e.g., an RFID tag 55, disposed on or at least partially within the body 51 to identify the item to be tracked via the RFID fob 50 in a manner well known to those having ordinary skill in the art. In accordance with one preferred and non-limiting embodiment of the present invention, the term “disposed on or at least partially within” is intended to encompass any one of a number of techniques for attaching, connecting, or embedding the RFID tag 55 on the fob 50, such as fastening, adhering via an adhesive or adhesive member, applying, attaching via a separate carrier, etc. In accordance with a particular non-limiting embodiment, the RFID tag 55 is disposed on or at least partially within the fob 50 by being embedded at least partially within, and even more particularly by being fully embedded within, the material of the fob 50, as shown in FIGS. 4-6. Of course, it should be recognized that the signal emitting member, e.g., the RFID tag 55, may be any member capable of emitting a readable signal, and the signal emitting member may be associated with, attached to, or embedded within the fob 50.

The signal emitting member 55, e.g., the RFID tag, may be programmed or reprogrammed with any desired information that can be read by an appropriate controller or signal receiving mechanism, such as an antenna or the like. For example, the RFID tag 55 may include information and data associated with the item, the object, the person, the device, the equipment, etc., such as location information, attributes, conditions, status information, state information, group information, user information, authorization data, authentication data, or any other data or information that can be assigned to or associated with the specified item (or item grouping). In a further preferred and non-limiting embodiment, provided is a system that is configured, programmed, and/or adapted to program or (directly or indirectly) communicate with one or more signal emitting members. This system can be configured to interact with the fob 50 (and, thus, the signal emitting member) whether attached to or detached from the band 10.

Figure 7:
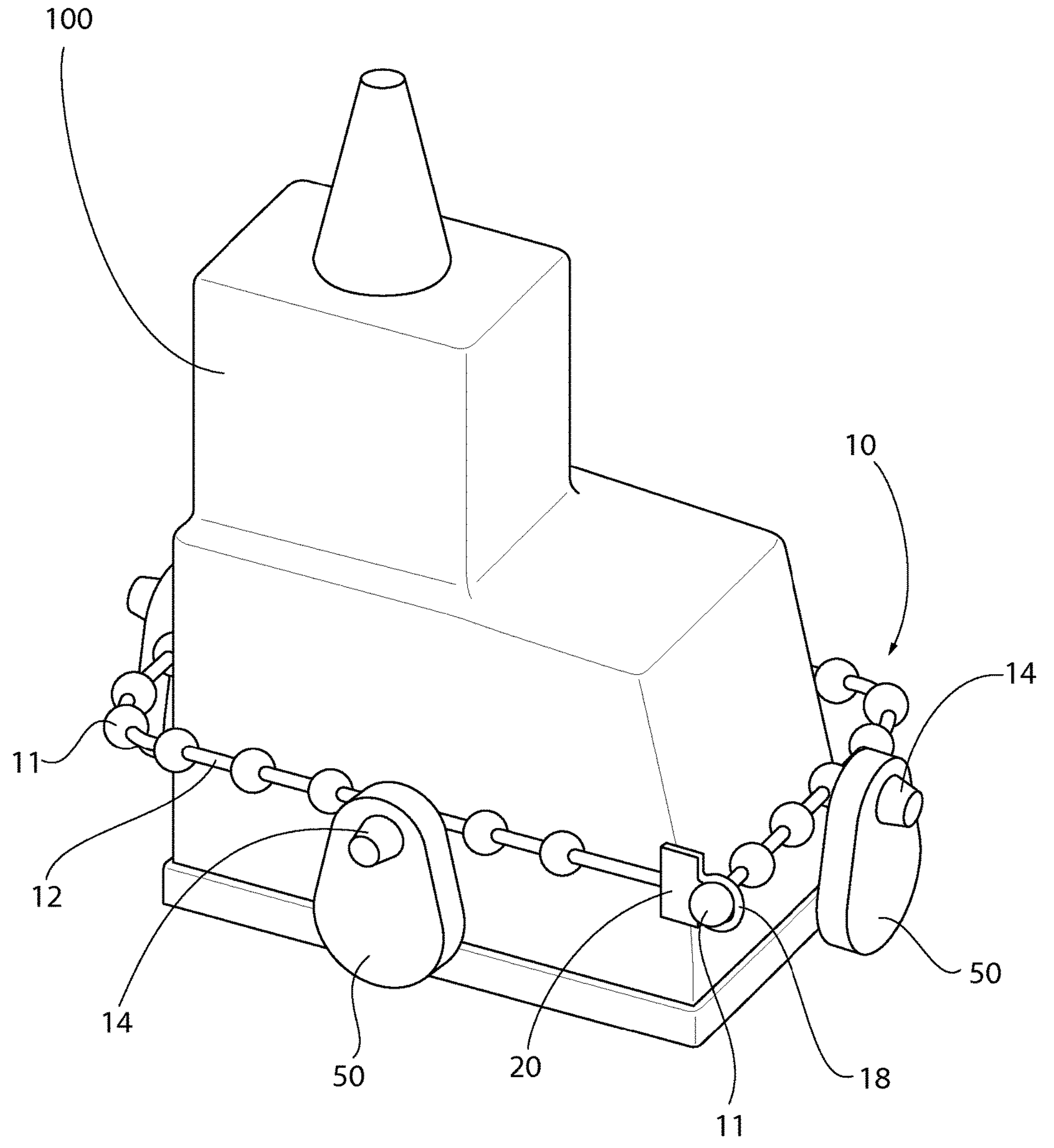
FIG. 7 is a perspective view of an item to be tracked having the signal emitting member attachment system disposed on the item according to the principles of the present invention.

With further reference to FIGS. 1, 2, and 7, the adjustable band 10 can be attached to or placed on an item 100 to be tracked by wrapping the adjustable band 10 around the item 100. After the adjustable band 10 is wrapped around the item 100 and stretched to form a tight fit about the item 100, the excess length of the band 10 may be cut off at or near one of the joints 11 to cinch or position the band 10 about the item 100. The nub 14 on the last joint 11 on the re-sized band 10 is then cut off and the last joint 11 is inserted through the aperture 19 in the loop 18. As shown in FIG. 7, the joints 11 are sized larger than the aperture 19 in the loop 18 so that passing the joint 11 through the loop 18 serves to secure the ends of the adjustable band 10 together around the item 100. The interaction between the joints 11 and the loop 18 are similar to the interaction (and attachment and removal) between the nub 14 and hole 54 discussed above. Also, as shown in FIGS. 2 and 7, according to one preferred and non-limiting embodiment of the invention, each joint 11 comprises a spherical ball that defines a single point of or minimal contact 13 between itself and the item 100 to be tracked in order to minimize contact between the adjustable band 10 and the item 100, and eliminate the entrapment of dust, contaminants, and biohazards between the adjustable band 10 and the item 100. In particular, and based upon the geometry of the components of the band 10, optionally coupled with the use of certain desired materials of construction (e.g., silicon rubber), the trapping of dust, contaminants, and/or biohazards is avoided, as these contaminants do not have pockets or surfaces in or on which they can adhere or settle. It is to be appreciated that the adjustable band 10 may alternatively be attached to or placed on the item 100 by any mechanism or method known to be suitable to those having ordinary skill in the art, such as by a fastener or adhesive member.

Further, as shown in FIGS. 2 and 7, the adjustable band 10 is configured so that multiple fobs 50 may be attached to the band 10 and connected to the item 100 to be tracked. For instance, three fobs 50 may be attached to the band, as is shown. This provides flexibility in terms of tracking larger items. With larger items, the position of an individual signal emitting member, e.g., RFID tag 55, may be located too far from the reader or not in an ideal orientation for scanning by the reader. By attaching multiple fobs 50 to the item 100 about the perimeter of the item 100, the scanning of the item 100 becomes easier and more efficient since the item 100 may be accurately scanned in multiple positions and orientations. Further, the multiple fobs 50 attached to the item 100 may incorporate RFID tags 55 of different frequencies, such as HF and UHF, in order to provide for added tracking flexibility. It is to be appreciated that the adjustable band 10 may be configured to have any number of fobs 50 attached thereto in a variety of different spaced configurations along the band 10.

According to one particular embodiment of the invention, at least a portion of the adjustable band 10 and at least a portion of the fob 50 are made from a silicon rubber material. Different formulations of silicon, or other rubber material, can be mixed to obtain the desired qualities for both the adjustable band 10 and the fob 50. When used in connection with medical devices, such as endoscopes, in a hospital environment, silicon rubbers offer resistance to acids, bases, solvents, oils, water, and heat. This makes the material ideal for the process of cleaning of medical devices, such as endoscopes. It is to be appreciated, however, that the adjustable band 10 and the fob 50 may be made from any rubber, plastic, or other type of material known to be suitable to those having ordinary skill in the art.

Also, the adjustable bands 10 and the fobs 50 may be made in different colors or be otherwise visually differentiated. For instance, the bands 10 and fobs 50 may be color coded to identify items 100 belonging to different departments or to distinguish between particular models or types of items 100. Some users may want to utilize one color to identify fobs 50 having UHF RFID tags 55 and fobs 50 having HF RFID tags 55.

It is further envisioned that these fobs 50 can be sized and shaped differently, or include patterns, letters, or any other visual markings. For example, in one preferred and non-limiting embodiment, the signal emitting member attachment system may be used to track a person, such as a child. As such, the fobs 50 may be offered in a variety of fanciful shapes, colors, patterns, lights (e.g., LEDs), and/or labels. Further, it is envisioned that the fobs 50 may be customized by the user or child prior to attachment to the band 10. In this manner, the user can create a “charm bracelet” that is attractive, but offers the further functionality discussed above.

According to one particular embodiment of the invention, the item 100 to be tracked is a medical device used in a health care setting, such as a hospital, clinic, or other patient care facility. More particularly, the item 100 is an endoscope. However, use of the adjustable band 10 and the RFID fobs 50 is not limited to tracking endoscopes or other medical devices and equipment. For instance, the system of the band 10 and RFID fobs 50 could be attached to a patient’s wrist or a wheelchair to track the patient’s whereabouts within the facility. To that end, the adjustable band 10 may vary in configuration to be more suitable for being worn by a patient. For instance, the band 10 may be configured to have its ends connected by a button snap or a zip tie or a similar mechanism. It is also to be appreciated that the adjustable band 10 and fobs 50 are configured such that they may be attached to a large variety of items associated with a large variety of industries so long as the item is able to have the adjustable band 10 wrapped around itself or otherwise attached thereto.

With reference to FIGS. 1-7, a method of attaching at least one signal emitting member 55 (e.g., RFID tag) is provided in accordance with a preferred and non-limiting embodiment of the invention. The method includes the steps of providing an adjustable band 10 that includes a plurality of joints 11 interconnected by flexible band segments 12, a plurality of nubs 14 each extending from a respective one of the plurality of joints 11, and a loop 18, which defines an aperture 19, disposed at a first end of the adjustable band 10; providing at least one fob 50, which has the at least one signal emitting member 55 disposed thereon or at least partially therein; wrapping the adjustable band 10 around the item 100 to be tracked; cutting an excess length of the adjustable band 10 at one of the joints 11 to position the adjustable band 10 about the item 100 and form a second end of the adjustable band 10 opposite to the first end; removing the nub 14 from the joint 11 at the second end of the adjustable band 10; connecting the first end of the band to the second end of the band by inserting the joint 11 at the second end of the adjustable band 10 through the aperture 19 in the loop 18 at the first end of the adjustable band 10 to secure the adjustable band 10 to the item 100; and connecting the at least one fob 50 to one of the plurality of nubs 14 of the adjustable band 10.

It is to be understood that the invention may assume various alternative variations and step sequences, except where expressly specified to the contrary. It is also to be understood that the specific devices and processes illustrated in the attached drawings, and described in the specification, are simply exemplary embodiments of the invention. Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope thereof. For example, it is to be understood that the present invention contemplates that, to the extent possible, one or more features of any embodiment can be combined with one or more features of any other embodiment.

The invention claimed is:

1. A signal emitting member attachment system for attaching at least one signal emitting member to an item to be tracked, comprising:

an adjustable band configured to be placed on or attached to the item; and at least one fob, wherein the adjustable band and the at least one fob are configured so that the at least one fob is attachable to the band, wherein the at least one signal emitting member is disposed on or at least partially within the at least one fob, wherein the adjustable band comprises a plurality of joints interconnected by flexible band segments, wherein at least one nub extends from at least one of the plurality of joints, the at least one nub configured to connect the at least one fob to the adjustable band, wherein the flexible band segments, the plurality of joints, and the at least one nub are comprised of a flexible elastic material, wherein each of the plurality of joints comprise a spherical ball configured to define a single point of direct contact between the spherical ball itself and the item such that the flexible band segments interconnecting the plurality of joints are spaced apart from the item when the adjustable band is placed on or attached to the item, wherein the adjustable band comprises a loop at one end of the adjustable band, wherein the loop defines an aperture, and wherein a diameter of each of the plurality of joints is greater than a diameter of the aperture.

2. The signal emitting member attachment system according to claim 1, wherein the adjustable band is configured to be placed on or attached to the item by being wrapped around the item.

3. The signal emitting member attachment system according to claim 1, wherein the at least one signal emitting member is embedded at least partially within the at least one fob.

4. The signal emitting member attachment system according to claim 1, wherein the flexible band segments, the plurality of joints, and the at least one nub are comprised of a silicon rubber material.

5. The signal emitting member attachment system according to claim 1, wherein the adjustable band is configured to have a plurality of fobs attached thereto and the at least one fob comprises at least two fobs.

6. The signal emitting member attachment system according to claim 5, wherein the adjustable band is configured to space the at least two fobs around a perimeter of the item to be tracked.

7. The signal emitting member attachment system according to claim 5, wherein the at least two fobs comprise at least one fob having a signal emitting member that transmits high frequency signals and at least one fob having a signal emitting member that transmits ultra high frequency signals.

8. The signal emitting member attachment system according to claim 5, wherein the at least two fobs are color coded or otherwise visually differentiated.

9. The signal emitting member attachment system according to claim 1, wherein the at least one fob is removably attachable to the band.

10. The signal emitting member attachment system according to claim 1, wherein the at least one nub extends from at least one of the plurality of joints in a direction substantially perpendicular to the band segments adjacent to the at least one of the plurality of joints.

11. The signal emitting member attachment system according to claim 1, wherein the at least one nub comprises a stem extending from the at least one joint, and a shaped head disposed on the stem at an end opposite the at least one joint.

12. The signal emitting member attachment system according to claim 11, wherein the shaped head is a conical tapered head tapering outwardly in a direction toward the at least one joint to define an annular abutment surface.

13. The signal emitting member attachment system according to claim 11, wherein the at least one fob comprises a body having a first side and a second side, and a shaped hole extending through the body from the second side to the first side configured to at least partially receive at least a portion of the shaped head.

14. The signal emitting member attachment system according to claim 11, wherein the at least one fob comprises a body having a first side and a second side, and a shaped hole extending through the body from the second side to the first side configured to at least partially receive at least a portion of the shaped head, wherein the shaped head is a conical tapered head tapering outwardly in a direction toward the at least one joint to define an annular abutment surface, and wherein the shaped hole is a tapered hole tapering inwardly from the second side to the first side and configured to receive the conical tapered head of the nub so that, when the conical tapered head of the nub extends completely through the hole, the annular abutment surface engages the first side of the at least one fob to connect the at least one fob to the adjustable band.

15. The signal emitting member attachment system according to claim 1, wherein the loop is configured to receive and retain at least one joint disposed at an opposite end of the adjustable band to secure the adjustable band to the item to be tracked.

16. The signal emitting member attachment system according to claim 1, wherein the at least one fob is comprised of the flexible elastic material, wherein the fob comprises a hole, wherein a diameter of at least a portion of the at least one nub is greater than a diameter of at least a portion of the hole, and wherein at least one of the at least one nub and the hole of the at least one fob are configured to flex when the at least one fob is connected to or removed from the adjustable band as the at least one nub is urged through the hole due to the nature and flexibility of the flexible elastic material.

17. The signal emitting member attachment system according to claim 1, wherein the loop is configured to receive two or more of the plurality of joints interconnected by the flexible band segments through the aperture, wherein the loop is configured to retain a latest joint of the two or more joints that passes through the aperture to secure the adjustable band to the item to be tracked, and wherein the at least one nub is configured to be removed from the at least one of the plurality of joints.

18. A method of attaching at least one signal emitting member to an item to be tracked, comprising:

providing an adjustable band;

providing at least one fob, the at least one fob having the at least one signal emitting member disposed thereon or at least partially therein;

wrapping the adjustable band around the item;

wherein the adjustable band comprises a plurality of joints interconnected by flexible band segments, wherein each of the plurality of joints comprise a spherical ball configured to define a single point of direct contact between the spherical ball itself and the item such that the flexible band segments interconnecting the plurality of joints are spaced apart from the item when the adjustable band is wrapped around the item, wherein at least one nub extends from at least one of the plurality of joints, the at least one nub configured to connect the at least one fob to the adjustable band, wherein the adjustable band comprises a loop at one end of the adjustable band, wherein the loop defines an aperture, and wherein a diameter of each of the plurality of joints is greater than a diameter of the aperture, the method further comprising:

connecting the at least one fob to the at least one nub;

removing at least one joint of the plurality of joints at an opposite end of the adjustable band;

passing a next joint following the at least one joint at the opposite end of the adjustable band through the aperture when the adjustable band is wrapped around the item to secure the adjustable band to the item.

19. The method according to claim 18, wherein the at least one fob comprises a plurality of fobs, wherein the at least one nub comprises a plurality of nubs, and wherein the method further comprises attaching a plurality of fobs to the plurality of nubs.

20. The method according to claim 18, wherein the at least one fob is comprised of the flexible elastic material, wherein the fob comprises a hole, wherein a diameter of at least a portion of the at least one nub is greater than a diameter of at least a portion of the hole, the method further comprising:

applying a force to the at least one nub to urge the at least one nub through the hole which causes at least one of the at least one nub and the hole of the at least one fob to flex due to the nature and flexibility of the flexible elastic material when connecting or removing the at least one fob from the adjustable band.

21. The method according to claim 18, wherein the next joint comprises a nub extending therefrom, and wherein the method further comprises removing the nub from the next joint before passing the next joint through the aperture.

22. The method according to claim 18, wherein the item is a medical device, the method further comprising cleaning, using at least one of an acid, a base, a solvent, an oil, heat, or any combination thereof, the medical device with the adjustable band secured to the medical device.

23. A signal emitting member attachment system for attaching at least one signal emitting member to a medical device to be tracked, comprising:

an adjustable band configured to be placed on or attached to the medical device; and at least one fob, wherein the adjustable band and the at least one fob are configured so that the at least one fob is removably attachable to the band, wherein the at least one signal emitting member is disposed on or at least partially within the at least one fob, wherein the at least one signal emitting member is configured to emit a signal that identifies the medical device, wherein the adjustable band comprises a plurality of joints interconnected by flexible band segments, wherein at least one nub extends from at least one of the plurality of joints, the at least one nub configured to connect the at least one fob to the adjustable band, wherein the adjustable band and the at least one fob are comprised of a silicon rubber material, wherein each of the plurality of joints comprise a spherical ball configured to define a single point of direct contact between the spherical ball itself and the medical device such that the flexible band segments interconnecting the plurality of joints are spaced apart from the medical device when the adjustable band is placed on or attached to the medical device, wherein the adjustable band comprises a loop at one end of the adjustable band, wherein the loop defines an aperture, and wherein a diameter of each of the plurality of joints is greater than a diameter of the aperture.

* * * * *